United States Patent [19]

Kim et al.

[11] 4,029,458
[45] June 14, 1977

[54] EXTRUSION DIE

[75] Inventors: Heung Tai Kim, Avon Lake; Gary F. Wilson, Grafton, both of Ohio

[73] Assignee: The B.F. Goodrich Company, Akron, Ohio

[22] Filed: June 24, 1975

[21] Appl. No.: 589,890

[52] U.S. Cl. .......................... 425/135; 425/192 R; 425/381; 425/466; 425/DIG. 33
[51] Int. Cl.[2] ........................................ B29F 3/04
[58] Field of Search ............ 264/209, 176 R, 40.5, 264/DIG. 33; 425/466, 381, 467, 380, 191, 190, 192, 151, 150, 135, 3, DIG. 33, 162; 72/264, 265

[56] References Cited

UNITED STATES PATENTS

| 3,368,241 | 2/1968 | Williams | 425/466 X |
| 3,649,148 | 3/1972 | Waltman et al. | 425/466 X |
| 3,764,253 | 10/1973 | Waterloo | 425/466 |
| 3,865,528 | 2/1975 | Roess | 425/466 X |

*Primary Examiner*—Francis S. Husar
*Assistant Examiner*—Mark Rosenbaum
*Attorney, Agent, or Firm*—Joseph Januszkiewicz; W. A. Shira, Jr.

[57] ABSTRACT

An extrusion die having a linearly movable mandrel that controls the thickness of the extrudate as it emanates from the die head. A piston within the die head is made part of the mandrel to control the position of the mandrel's edge relative to the die's outlet opening, with sensing means in the die assembly and being operative to provide a signal indicative of the relative position of such mandrel to the die head.

4 Claims, 1 Drawing Figure

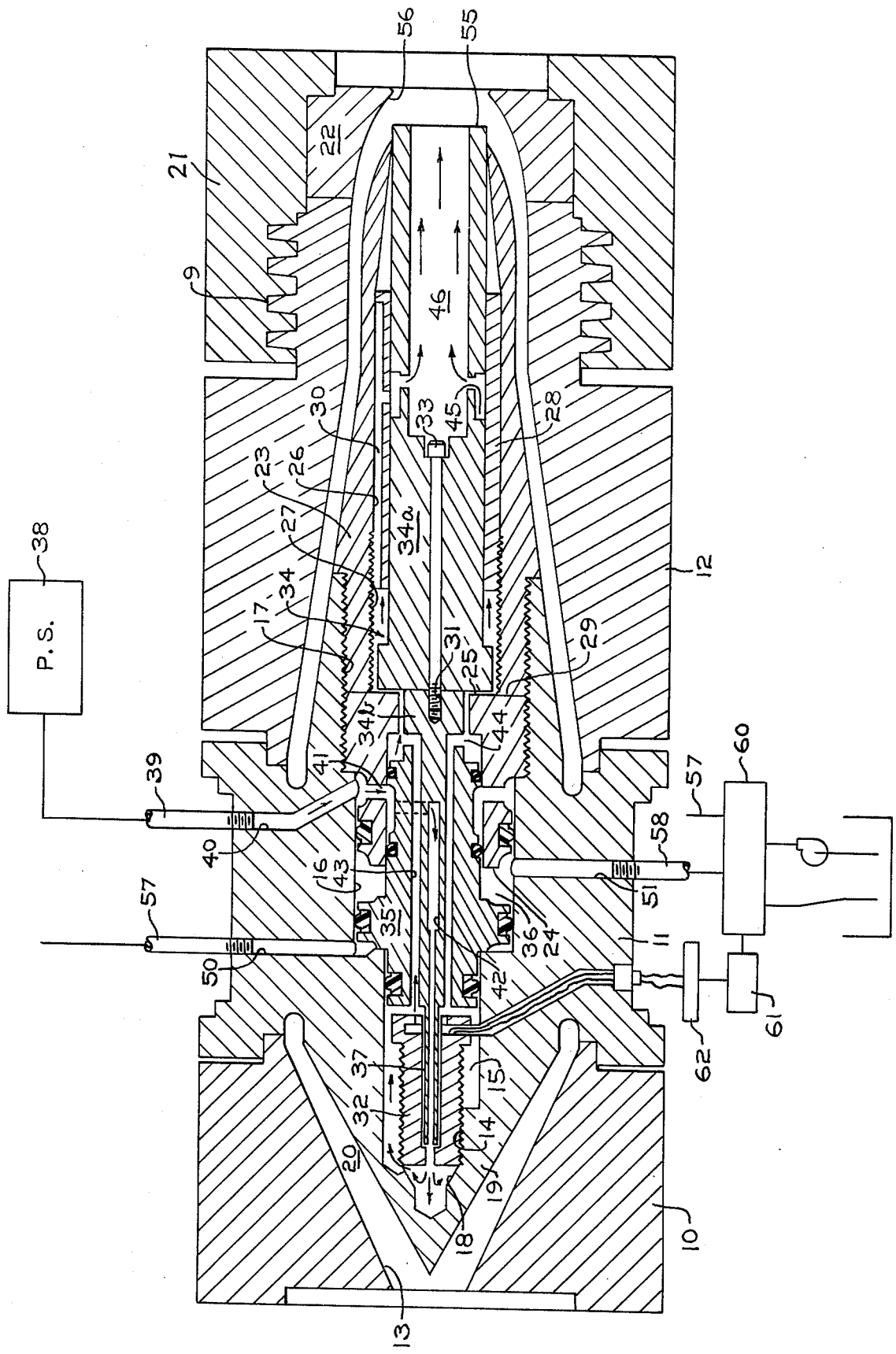

EXTRUSION DIE

BACKGROUND OF THE INVENTION

This invention relates to a new and improved extrusion die assembly and more particularly to such an assembly having a movable mandrel therein that controls the opening in the die head thereof to control the wall thickness of a parison being formed at such opening.

In the processing of thermoplastic material by a die head, it is important to control the wall thickness of the extrudate as it issues from the die head in order to properly control the type of parison being formed, and the subsequent article being formed. Where unusual shaped plastic bottles are being formed from the parison, it is imperative to control the wall thickness such that the thicker material is at that location on the parison which will undergo the greatest amount of stretching. By properly controlling the wall thickness of the parison, one conserves material and enhances the quality of the product. Prior art devices have attempted to control the die head opening relative to the torpedo by manipulating the die head itself; however, this has proved unsatisfactory in design and not responsive to producing a quality product. The instant invention proposes to control the wall thickness of the parison by controlling a linearly adjustable or movable mandrel within the torpedo that varies the opening of the die head. The movement of the mandrel is done internally by means of hydraulic power which simplifies the controls and reduces the number of movable parts thereby improving the response time to a command signal which action improves accuracy and repeatability of the movement. By using the internally movable mandrel the flow channel is not interrupted as with cross head designs. Further with such designs incremental changes in wall thickness can be more accurately controlled. By use of the internally movable mandrel and piston control, rapid disassembly is facilitated of the portions that need cleaning. The sensing device for locating the position of the movable mandrel relative to the die is mounted internally to minimize damage and provide a more accurate feedback. By specifically locating the sensing device close to the apex of the torpedo to which the coolant is directed, a uniform temperature is maintained on the sensing device which extends the service life thereof.

SUMMARY

The present invention contemplates an apparatus wherein the mandrel is linearly movable relative to the outlet of the die head, with the mandrel being controlled by a piston internally of the housing containing the die head. The mandrel's position is monitored internally within the die head housing to provide a unit that is compact and responsive to the controls that positions the mandrel relative to the die head.

BRIEF DESCRIPTION OF THE DRAWING

The drawing shows in cross section an extrusion die assembly with controls and fluid circuit shown schematically.

DETAILED DESCRIPTION

Referring to the drawing there is shown an extrusion die assembly having a housing with a hollow torpedo positioned therein. The housing has a plurality of sections 10 through 12 suitably connected together to form a die housing. One end section 10 referred to as the adapter section 10 has a central conical shaped bore 13. The adaptor section 10 is suitably connected to a conventional screw extruder not shown from which an extrudate is received by the die housing. A spider section 11 adjoining the adapter section 10 has a stepped bore extending longitudinally centrally therein. Such stepped bore has two forwardly disposed portions 14 and 15, an intermediate portion 16 and a threaded portion 17. The forward most bore portion 14 communicates with a tapered reduced bore 18 that is closely adjacent to the apex 19 of spider section 11. The conical shaped bore 13 of adapter section 10 cooperates with the apex 19 of spider 11 to provide an annular passageway 20 for the passage of melt therethrough in a manner old and well known in the art. The other end section 12 cooperates with the other tapered end portion of spider section 11 to form an annular passageway that is the continuation of annular passageway 20 except for interruptions of the circumferentially spaced leg portions of spider section 11. As disclosed the outer portion of the spider 11 with sections 10 and 12 form the die housing while the inner portion of spider 11 with its stepped bore form a portion of the torpedo which is to be described.

The reduced end portion 9 of end section 12 threadedly receives a die holder 21 which captively retains a die head 22 in abutting engagement with the outermost end portion of the threaded connection 9. Such threaded connection 9 is of large pitch threads to allow for the quick removal of die holder 21 and the die 22 for quick replacement and cleaning. Threadedly secured to the threaded portion 17 of spider section 11 is a sleeve member 23 having a forwardly disposed abutment 24 which will form one end of a chamber and an intermediately disposed abutment 25. Such sleeve member 23 may be split into a forwardly disposed portion and a rearwardly disposed portion along split 29. The central bore 26 of sleeve member 23 is internally threaded as at 27 to receive a cylindrical guide member 28. Guide member 28 has a plurality of laterally spaced bores 30 for the passage of pressurized air in a manner to be described. The inner portion of spider 11 along with sleeve member 23 and cylindrical guide member 28 form the hollow torpedo that cooperates with the die housing to change the cylindrical melt to an annular melt.

Suitably secured to the forwardly reduced bore portion 14 of spider 11 is a transducer 32 for a purpose to be described. Slidably mounted in the central passageway of the stepped bore of spider 11 and within the central passageway of guide member 28 is mandrel 34. Mandrel 34 has a piston 35 integrally formed on its intermediate portion which operates in the chamber 36 formed by the intermediate bore portion 16, the abutment 24 of sleeve member 23 and the shoulder formed at the juncture of the intermediate bore portion 16 and reduced forwardly disposed bore portion 15. The forwardly disposed portion of mandrel 34 has a hollow core 37 made of a permanent magnet material that cooperates with the transducer 32 to provide an output signal as in a differential transformer which accurately monitors the position of the mandrel relative to the die head 22.

A suitable source of pressurized air indicated generally as 38 supplies pressurized air via conduit 39 to a passageway 40 in spider section 11, which in turn communicates via passageway 41 in sleeve member 23 with a passageway 42 that communicates with the central bore of the hollow core 37 such as to direct the coolant of pressurized air to the bore 18 and the apex of the spider 11. Such pressurized air is then directed through a plurality of circumferentially spaced bores in the forward portion of transducer 32 for movement through bore portion 15, through a bore 43 in mandrel 34 for passage via bore 44 to the clearance space provided between the sleeve 23 and the outer surface of mandrel 34 for subsequent passage through circumferentially spaced bores 30 in guide member 28, thence via laterally extending bores 45 to the central opening 46 in the rear portion of mandrel 34 for flow outwardly past the die head 22 to facilitate distension of the parison formed at such die head. Mandrel 34 for convenience and ease of cleaning is split into two portions along the abutment 25 into a section 34a and 34b such that section 34b has a threaded bore 31 to receive threaded end of a pin 33. Pin 33 has an enlarged head portion such that it securely fastens the split portions 34a to 34b to form the unitary mandrel 34. The convenience of the split mandrel 34 permits the quick removal of pin 33 and the section 34a along with guide member 28, forwardly disposed sleeve portion 23 and die 22 for cleaning and changing for different parisons, only the forwardly disposed sleeve portion 23 and the forwardly disposed portion 34a are changed without disassembling the whole head. This will further prevent any contamination in the hydraulic system and prevent displacement or unnecessary movement of the delicate, intricate parts of the transducer, piston and related parts.

Bores 50 and 51 in spider section 11 communicate with the respective opposite end portion of chamber 36 to selectively control the movement of the piston 35 and the position of the mandrel 34 as well as the mandrel's annular forward portion 55 relative to the annular edge 56 of the die head 22. The respective bores 50 and 51 are connected via conduits 57 and 58 respectively to a control valve 60 which controls the pressurization and exhaust of conduits 57 and 58 in accordance with the signal input to an electrically operated valve positioning means 61.

Pre-programmed control means 62 which may be a time cycle control of various pre-selected resistances for each repetitive cycle provides an output signal to the valve positioning means 61. When the flow of current reaches the valve positioning means 61, the valve positioning means 61 will react in proportion to the magnitude of the output signal to position the valve piston 35 and the mandrel 34 to a new position. Substantially instantaneously with such action a feed back signal is generated by the transducer 32 and conveyed back to the control means 62. Such feed back signal is of a magnitude dependent on the position of the core relative to the transducer 32. The control means compares the feed back signal with the preset programmed output signal and transmit a modified signal to the valve positioning means 61 causing a modification of the mandrel's position. This modified movement is an adjustment designed to bring the differences between the signals from the programmed output signal and the feed back signal into a prescribed range.

In the operation of the invention as described above, the operator will set up the program means in the control means 62 to provide a series of output signals which will position the mandrel to predetermined positions at pre-set times to provide a parison of varying wall thicknesses as prescribed and modified by the feed back signal to produce a pre-determined shaped parison. The program is set to repeat the output signal for each cycle of operation. This, as stated above, can be done by a timed cycle or a timed pre-programmed time signal in a manner well-known in the art. During the extrusion process, an extrudate passes as a cylindrical form into an annular form via annular passageway 20. The thickness of the extrudate issuing from the die 22 is determined by the position of annular edge 55 of mandrel 34 relative to annular edge 56 of die head 22. With the mandrel held stationary, the extrudate will continue at the same thickness until control means 62 dictates a change in the position of the piston 35 dictated by the valve positioning means 61 and monitored by the transducer 32 which provides the feed back signal to the control means 62. The parison is formed of varying wall thickness and each cycle is repeated to reproduce the same type of parison. The changeover of die head 22 or mandrel section 34a can be quickly effected by the removal of pin 33 and replacement of either mandrel section 34a or die head 22 or by replacement of both parts.

Various modifications are contemplated and may obviously be resorted to by those skilled in the art without departing from the described invention, as hereinafter defined by the appended claims, as only a preferred embodiment thereof has been described.

We claim:

1. An extrusion die assembly comprising a housing having an inlet and an outlet opening, an elongated bore in said housing extending from said inlet to said outlet, a die head positioned at said outlet, a torpedo positioned within said bore with an end of the torpedo disposed adjacent said die head, said torpedo having a recess therein with an opening extending therefrom at the said one end of the torpedo, a mandrel slidably received by said recess of said torpedo with a portion of said mandrel extending through said opening to a location adjacent said die head, a piston on said mandrel within said recess and cooperative therewith to define a pair of spaced chambers, control means operatively connected to said chambers for selectively pressurizing one or the other of said chambers to control the position of said mandrel relative to said torpedo, said mandrel having an annular edge on the end thereof adjacent to said die head to control the wall thickness of the material being extruded, said control means includes sensing means comprising a transducer located in said recess of said torpedo, and a magnetic core on said mandrel at the end thereof opposite said annular edge cooperative with said transducer to provide an output signal that is indicative of the relative position of said mandrel in said torpedo.

2. An extrusion die assembly as set forth in claim 1 wherein the torpedo tapers to a point at said inlet to form an apex, said magnetic core is positioned adjacent said apex and is provided with a bore therethrough, and a coolant supply means operatively connected to said bore of the magnetic core for continuously supplying coolant thereto and for passage therethrough to cool said apex of said torpedo, said mandrel having a central opening in the portion provided with said annular edge and said torpedo also having interconnected passageways therein communicating with the said opening of said mandrel to conduct said coolant from said apex through the torpedo and the said opening in said mandrel to provide pressurized air at said outlet to distend the material being extruded at said outlet.

3. An extrusion die assembly comprising a housing having an inlet and an outlet, and elongated opening in said housing extending from said inlet to said outlet, a die member mounted in said outlet to shape the outer diameter of a parison extruded through said die, a torpedo positioned in said opening, said torpedo having a conical shaped forward apex portion disposed adjacent said housing inlet, an intermediate portion and a tapering sleeve portion extending rearwardly from the intermediate portion with said tapering sleeve portion being threadedly connected to the intermediate portion, said torpedo having a centrally disposed recess that extends from said tapering sleeve portion to said apex, said recess of said torpedo having an electrical transducer including a movable core member at the said apex portion, a mandrel slidably mounted in said recess of said torpedo, said mandrel having a central bore therein with an annular edge at one end thereof, said annular edge of said mandrel disposed adjacent to and cooperative with said die member to control the thickness of the parison being formed and the said core member being secured to the other end of said movable mandrel, a piston secured to said mandrel and slidably received by said centrally disposed opening to provide a chamber, control means including electrically operated fluid pressure means operatively connected to said chamber to selectively apply pressure to one side of the piston and thereby vary the position of said annular edge at said outlet in response to an electrical signal input to said control means as modified by an electrical signal from said transducer in response to the position of said mandrel relative to said torpedo.

4. An extrusion die assembly comprising a housing having an inlet and an outlet opening, an elongated bore in said housing extending from said inlet to said outlet, a die head positioned at said outlet, a torpedo positioned within said bore with an end of the torpedo disposed adjacent said die head, said torpedo having a recess therein with an opening extending therefrom at the said one end of the torpedo, a mandrel slidably received by said recess of said torpedo with a portion of said mandrel extending through said opening to a location adjacent said die head, a piston on said mandrel within said recess and cooperative therewith to define a pair of spaced chambers, control means operatively connected to said chambers for selectively pressurizing one or the other of said chambers to control the position of said mandrel relative to said torpedo, said mandrel having an annular edge on the end thereof adjacent to said die head to control the wall thickness of the material being extruded, said die head is secured to said housing by a quick disconnect forward portion to facilitate rapid separation thereof, said mandrel comprises a forwardly disposed section separable from a rearwardly disposed section, said torpedo comprises a forwardly disposed tubular section separable from a rearwardly disposed tubular section, the part line of all said sections being approximately midway of said housing to facilitate the removal of said forwardly disposed sections and said die head.

* * * * *